US009341730B2

(12) United States Patent
Wu

(10) Patent No.: US 9,341,730 B2
(45) Date of Patent: May 17, 2016

(54) STEERING SUBMERSIBLE FLOAT FOR SEISMIC SOURCES AND RELATED METHODS

(75) Inventor: Zhaohong Wu, Katy, TX (US)

(73) Assignee: CGG SERVICES SA, Massy (FR)

( * ) Notice: Subject to any disclaimer, the term of this patent is extended or adjusted under 35 U.S.C. 154(b) by 906 days.

(21) Appl. No.: 13/422,474

(22) Filed: Mar. 16, 2012

(65) Prior Publication Data
US 2013/0242694 A1    Sep. 19, 2013

(51) Int. Cl.
G01V 1/38    (2006.01)
B63B 21/66    (2006.01)
B63B 22/18    (2006.01)

(52) U.S. Cl.
CPC .............. G01V 1/3817 (2013.01); B63B 21/66 (2013.01); B63B 22/18 (2013.01); G01V 2210/1293 (2013.01)

(58) Field of Classification Search
CPC ....... G01V 1/3817; B63B 21/66; B63B 22/18
USPC ............................................. 367/16; 114/245
See application file for complete search history.

(56) References Cited

U.S. PATENT DOCUMENTS

| 2,729,910 | A |  | 1/1956 | Fryklund |  |
|---|---|---|---|---|---|
| 2,771,961 | A | * | 11/1956 | Blake, Jr. ...................... | 181/115 |
| 3,019,412 | A | * | 1/1962 | Crawford ...................... | 367/173 |
| 3,160,133 | A |  | 12/1964 | Walker |  |
| 3,375,800 | A |  | 4/1968 | Cole et al. |  |
| 3,541,989 | A |  | 11/1970 | Leonard |  |
| 3,757,723 | A |  | 9/1973 | Pangalila |  |
| 4,421,049 | A | * | 12/1983 | Cholet ........................... | 114/245 |
| 4,463,701 | A | * | 8/1984 | Pickett ...................... | B63B 21/66 |
|  |  |  |  |  | 114/245 |
| 4,549,499 | A | * | 10/1985 | Huffhines ............. | G01V 1/3826 |
|  |  |  |  |  | 114/244 |
| 4,648,322 | A |  | 3/1987 | Heitz et al. |  |
| 4,721,180 | A | * | 1/1988 | Haughland et al. ........... | 181/111 |
| 4,726,315 | A | * | 2/1988 | Bell et al. ....................... | 114/244 |
| 4,974,213 | A | * | 11/1990 | Siwecki ........................... | 367/88 |
| 4,992,990 | A | * | 2/1991 | Langeland et al. ............. | 367/19 |
| 5,138,582 | A | * | 8/1992 | Furu ................................ | 367/16 |
| 5,164,922 | A | * | 11/1992 | Cappelen et al. ............. | 367/144 |
| 5,402,745 | A |  | 4/1995 | Wood |  |
| 5,532,975 | A | * | 7/1996 | Elholm ........................... | 367/16 |
| 5,546,882 | A | * | 8/1996 | Kuche .................. | G01V 1/3826 |
|  |  |  |  |  | 114/244 |
| 5,973,995 | A | * | 10/1999 | Walker et al. .................... | 367/20 |
| 6,002,648 | A | * | 12/1999 | Ambs ............................ | 367/159 |
| 6,011,752 | A |  | 1/2000 | Ambs et al. |  |
| 6,208,584 | B1 | * | 3/2001 | Skinner ............................ | 367/13 |
| 6,498,768 | B1 | * | 12/2002 | Gjestrum et al. ............... | 367/20 |
| 6,691,038 | B2 | * | 2/2004 | Zajac ............................. | 702/14 |

(Continued)

OTHER PUBLICATIONS

Tech Link, A Publication of Petroleum Geo-Services, "Innovations in Marine Operations", vol. 8, No. 2 Feb. 2008, pp. 1-4.

(Continued)

Primary Examiner — Ari M Diacou
(74) Attorney, Agent, or Firm — Patent Portfolio Builders PLLC

(57) ABSTRACT

Seismic sources including a steerable submersible float and related methods are provided. A seismic source includes a submersible float and a plurality of individual sources. The submersible float is configured to control at least one of a depth and a horizontal position of the submersible float by adjusting angles of one or more rotatable surfaces attached to the submersible float. The individual sources hang under the submersible float and are configured to operate at a depth larger than the depth of the submersible float.

20 Claims, 9 Drawing Sheets

(56) References Cited

U.S. PATENT DOCUMENTS

| | | | |
|---|---|---|---|
| 6,755,144 B1* | 6/2004 | Hocquet et al. | 114/242 |
| 7,415,936 B2 | 8/2008 | Storteig et al. | |
| 7,457,193 B2* | 11/2008 | Pramik | 367/16 |
| 7,804,738 B2 | 9/2010 | Storteig et al. | |
| 8,427,901 B2* | 4/2013 | Lunde et al. | 367/23 |
| 8,570,829 B2* | 10/2013 | Hovland et al. | 367/16 |
| 2004/0000446 A1* | 1/2004 | Barber, Sr. | 181/120 |
| 2005/0265122 A1* | 12/2005 | Grion | 367/21 |
| 2006/0176774 A1 | 8/2006 | Toennessen | |
| 2006/0215489 A1* | 9/2006 | Solheim et al. | 367/20 |
| 2006/0227657 A1* | 10/2006 | Tveide et al. | 367/16 |
| 2006/0227658 A1* | 10/2006 | Toennessen et al. | 367/18 |
| 2007/0019504 A1* | 1/2007 | Howlid et al. | 367/16 |
| 2007/0025182 A1* | 2/2007 | Robertsson | 367/18 |
| 2007/0064526 A1* | 3/2007 | Holo | 367/15 |
| 2007/0258322 A1* | 11/2007 | Hopperstad | 367/23 |
| 2008/0008039 A1* | 1/2008 | Robertsson et al. | 367/24 |
| 2008/0019214 A1* | 1/2008 | Pramik | 367/16 |
| 2009/0141587 A1* | 6/2009 | Welker et al. | 367/16 |
| 2009/0316526 A1* | 12/2009 | Grall | 367/20 |
| 2010/0226204 A1 | 9/2010 | Garliardi et al. | |
| 2011/0122725 A1* | 5/2011 | Hopperstad | 367/19 |
| 2011/0149681 A1* | 6/2011 | Hovland et al. | 367/15 |
| 2013/0070559 A1* | 3/2013 | Barker | 367/23 |
| 2013/0081564 A1* | 4/2013 | Brizard et al. | 114/259 |
| 2013/0083622 A1* | 4/2013 | Herrmann et al. | 367/15 |
| 2014/0321238 A1* | 10/2014 | Winfield | G01V 1/3826 367/17 |

OTHER PUBLICATIONS

Office Action mailed Feb. 11, 2015 in related AU Application No. 2013201350.

* cited by examiner

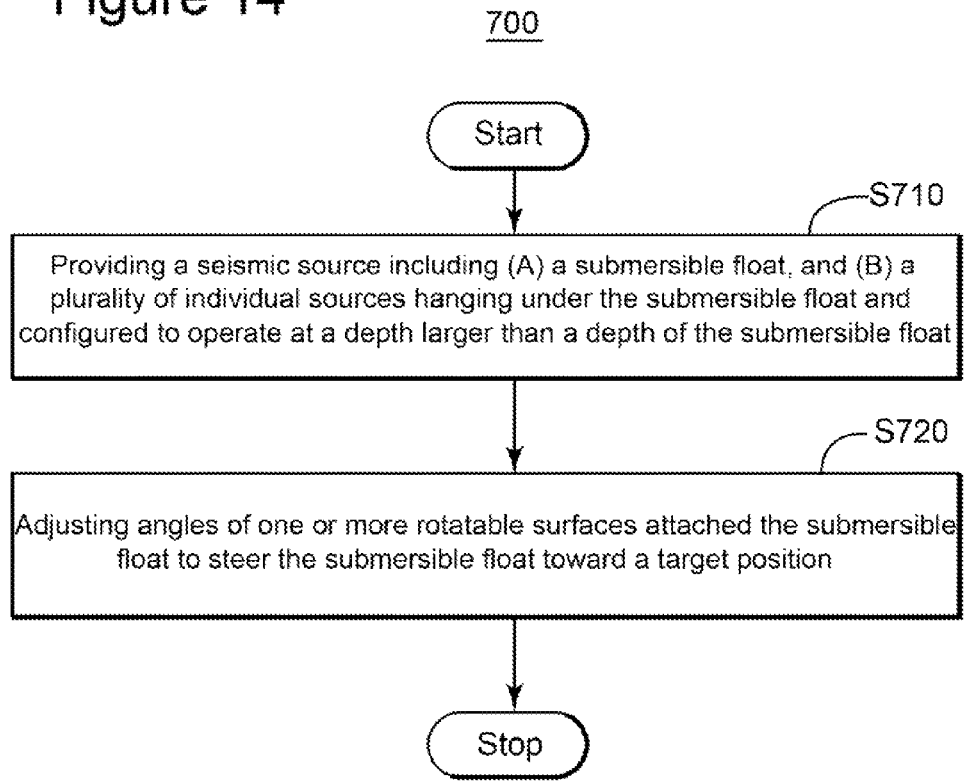

STEERING SUBMERSIBLE FLOAT FOR SEISMIC SOURCES AND RELATED METHODS

BACKGROUND

1. Technical Field

Embodiments of the subject matter disclosed herein generally relate to seismic sources having a steerable submersible float configured to control positions of individual seismic sources attached to the steerable submersible float and related methods.

2. Discussion of the Background

Marine explorations investigate and map the structure and character of geological formations under a body of water using reflection seismology. Reflection seismology is a method of geophysical exploration to determine the properties of earth's subsurface, which are especially helpful in the oil and gas industry. Marine reflection seismology is based on using a controlled source of energy that sends the energy into the earth. The depth and horizontal location of features causing reflections are evaluated by measuring the time it takes for the reflections to arrive at plural receivers. These features may be associated with subterranean hydrocarbon reservoirs.

A traditional marine exploration system is illustrated in FIG. 1. A vessel 100 tows a seismic source 102 and an array of seismic receivers 104 provided on streamers 106. The streamers may be disposed horizontally, i.e., lying at a constant depth relative to a surface 108 of the water. The streamers may be disposed to have other than horizontal spatial arrangements. The seismic source 102 is configured to generate a seismic wave 110, that propagates downward toward the seafloor 120 and penetrates the formations under the seafloor until eventually it is reflected at discontinuity locations 122. The reflected seismic wave 130 propagates upward until it is detected by one of the receivers 104 on the streamer 106. Based on the data collected by the receivers, an image of the subsurface formation is generated by further analyses of the collected data.

A seismic source array typically includes plural individual source elements grouped in one or more sub-arrays. The individual source elements may be distributed in various patterns, e.g., circular, linear, at various depths in the water. Maintaining relative horizontal positions and depths of the seismic sources and the streamers according to a desired geometry is desirable in order to ensure accuracy and resolution of the extracted information. However, achieving this type of control has proven challenging due to marine currents and other disturbances, including, for example, the trailing air bubbles that occur when compressed air guns are discharged.

For example, in U.S. Pat. No. 7,804,738 to Storteig et al., deflectors coupled via cables and ropes to a towed source provide a mechanism to control the horizontal position. However, this mechanism has an undesirable slow reaction time when necessary to adjust the position of the sources. In U.S. Pat. No. 7,415,936 to Storteig et al., besides deflectors, winched cables are used to steer the towed source. This mechanism also exhibits a slow reaction time. FIG. 2 illustrates a marine exploration system 200 in which two vessels 210 and 220 sail on correlated trajectories at a distance D from one another, while pulling a rope or cable 230 to which plural arrays of individual sources 240a, 240b, 240c and 240d are attached to be towed at a distance C from one another. Thus, in order to correct the position of a source, either the towing vessel needs to change its trajectory or winches need to be used. This mechanism also has an undesirably slow reaction time.

In U.S. Patent Application Publication No. 2010/00226204 to Gagliardi et al., a source useable for arctic marine exploration is towed underwater, the source including a floatation device with depth control via plural buoys. The source has no means of controlling its horizontal position.

To summarize, the conventional sources and means of controlling position and depth thereof have a slow reaction time and limited maneuverability.

Accordingly, it would be desirable to develop mechanisms and methods to more efficiently and fast steer and position a seismic source for marine exploration.

BRIEF SUMMARY OF THE INVENTION

Seismic sources according to exemplary embodiments include a steerable submersible float configured to control their position in a plane perpendicular to the towing direction by adjusting angles of one or more rotatable surfaces. These seismic sources provide the advantages of an enhanced flexibility and stability in their position during a marine exploration. The presence of the steerable submersible float enables arctic exploration, 4-dimensional (4D) time lapse acquisition and allows continuing marine exploration during a broader range of weather conditions. Source steering in a 4D time lapse acquisition refers to steering a source array to follow a source route from a previous acquisition conducted months or years ago in the same area. The source route can be irregular because of currents or other interference.

According to an exemplary embodiment, a seismic source configured to be towed underwater includes a submersible float and a plurality of individual sources. The submersible float is configured to control at least one of a depth and a horizontal position of the submersible float by adjusting angles of one or more rotatable surfaces attached to the submersible float. Here, the horizontal position is defined to be along a horizontal direction that is substantially perpendicular to a towing direction and to gravity. The individual sources hang under the submersible float and are configured to operate at a depth larger than the depth of the submersible float.

According to another exemplary embodiment, a method for performing seismic marine exploration includes providing a seismic source including (A) a submersible float, and (B) a plurality of individual sources hanging under the submersible float and configured to operate at a depth larger than a depth of the submersible float. The method further includes adjusting angles of one or more rotatable surfaces attached to the submersible float to steer the submersible float towards a target position.

According to another exemplary embodiment, a seismic source configured to be towed underwater includes a submersible float, a towing mechanism and individual sources. The submersible float is configured to be towed at a target depth and a target horizontal position. The towing mechanism is configured to connect the submersible float to a tow cable such that a longitudinal axis thereof to make an adjustable non-zero angle with a towing direction. The individual sources hanging under the submersible float and are attached at different positions along the longitudinal axis of the submersible float. The individual sources are configured to operate at a depth larger than the target depth of the submersible float.

BRIEF DESCRIPTION OF THE DRAWINGS

For a more complete understanding of the present invention, reference is now made to the following descriptions taken in conjunction with the accompanying drawings, in which:

FIG. 14 is a flowchart of a method for performing marine exploration according to an exemplary embodiment.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic source that is steered while being towed behind a vessel. However, the embodiments to be discussed next are not limited to steering seismic sources, but they may be applied to steering other towed equipment.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
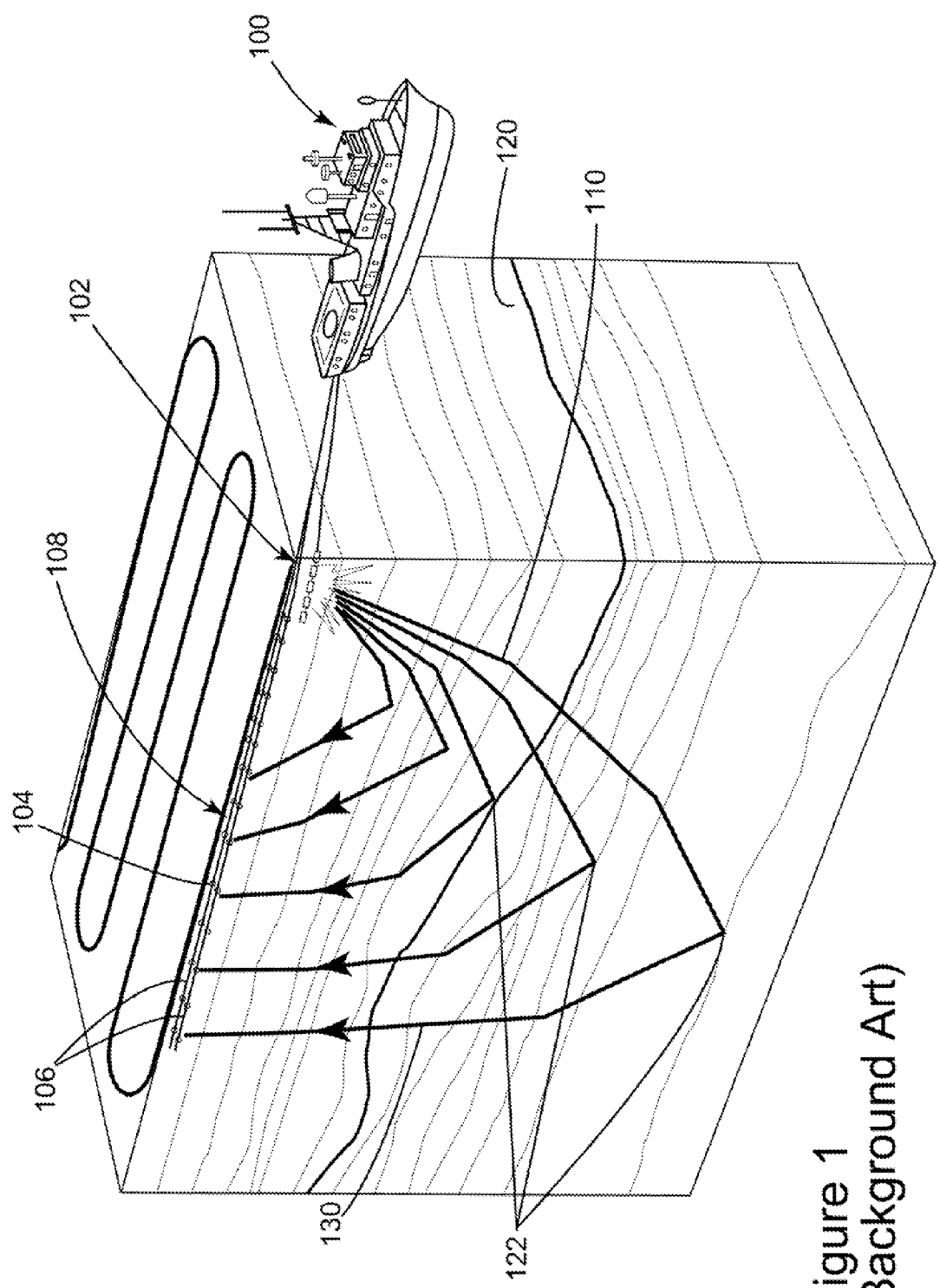
FIG. 1 illustrates a marine exploration system.
Figure 2:
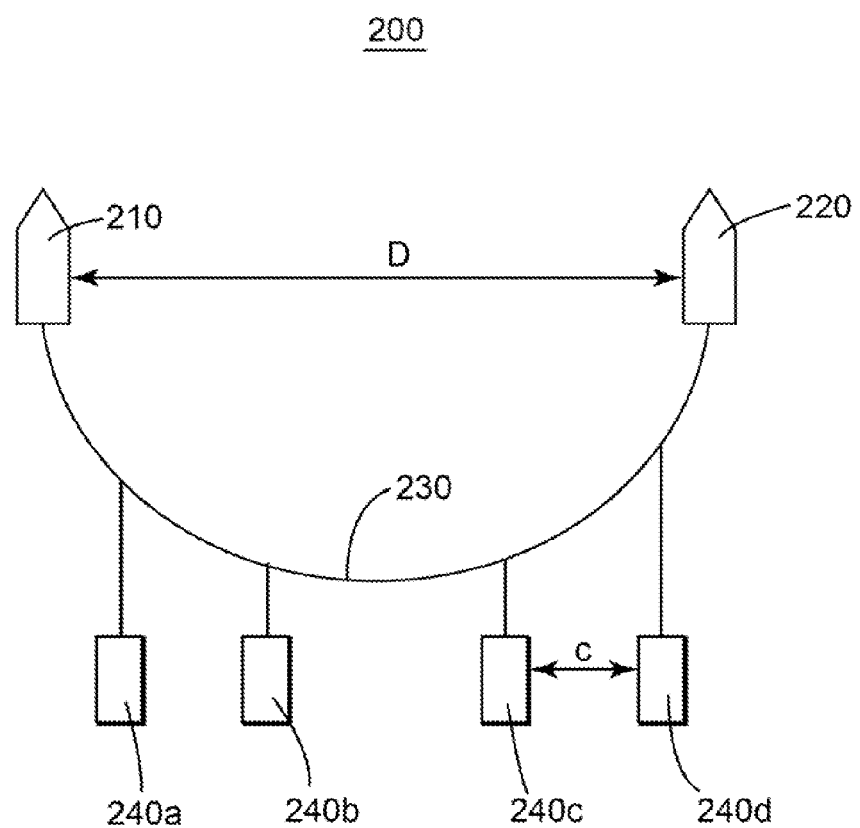
FIG. 2 is a schematic diagram of a seismic source towed by two vessels.
Figure 3:
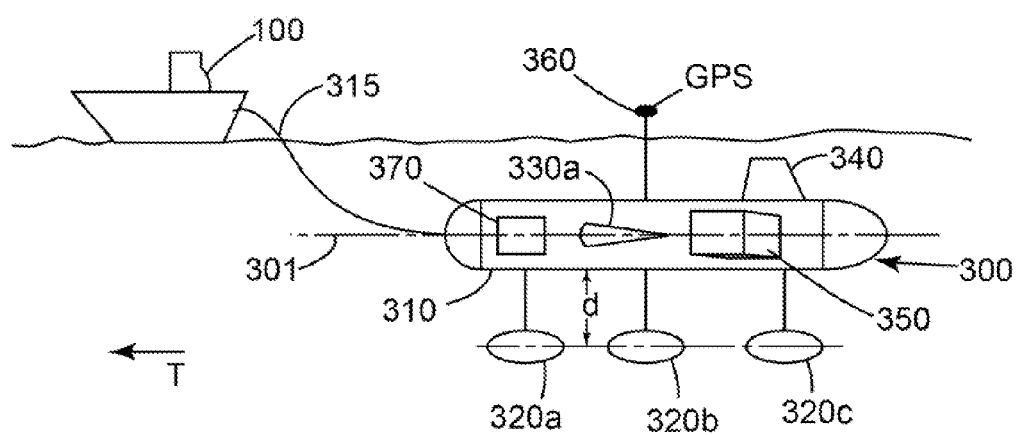
FIG. 3 is a side view of a seismic source according to an exemplary embodiment.

FIG. 3 illustrates a seismic source 300 to be towed by a vessel 100 according to an exemplary embodiment. Here the term "seismic source" refers to a device configured to generate a seismic wave. However, plural such sources may be grouped behind a vessel and the "seismic source" may include plural groups.

The seismic source 300 includes a submersible float 310 and plural individual sources 320a, 320b, 320c (the number of individual sources is not intended to be limited to three). The submersible float 310 is configured to operate at depths at which it is no longer affected by water surface effects and weather, for example, up to 15-20 m below the water surface. The individual sources 320a, 320b, 320c are attached under the submersible float 310 at different positions along a longitudinal axis 301 (in the towing direction T) of the submersible float 310. The individual sources may be air guns.

Figure 4:
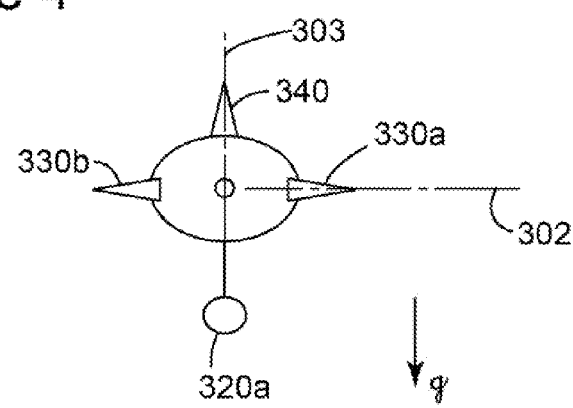
FIG. 4 is a front view of a submersible float of a seismic source according to an exemplary embodiment.

The submersible float 310 is connected to the vessel 100 via a towing cable 315. FIG. 3 illustrates a side view of the submersible float and FIG. 4 is a front view thereof, i.e., the longitudinal axis is as coming out of the page. In FIG. 4, a horizontal direction 302 is substantially perpendicular to the longitudinal direction 301 and a vertical direction 303 that is parallel to gravity g. The individual sources are heavy (e.g., hundreds of kilograms) so they tend to lie along the vertical direction 303.

The individual sources 320a, 320b and 320c may be configured to hang at an adjustable distance d (e.g., to 5-6 m) under the submersible float 310. In one embodiment, the individual sources may be withdrawn inside or near the submersible float to facilitate retrieval of the seismic source.

Figure 5:
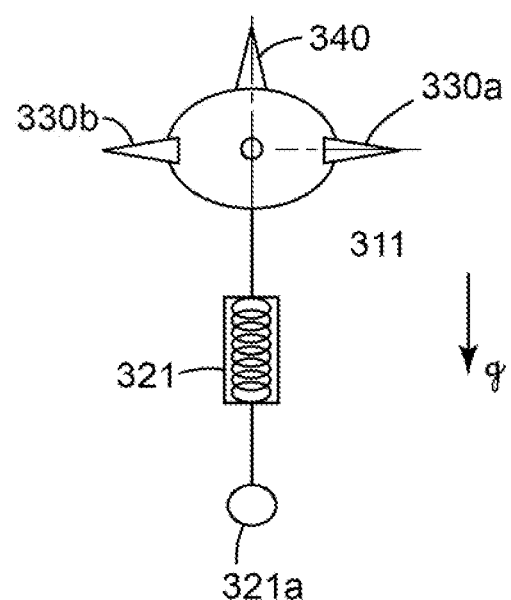
FIG. 5 is a front view of a submersible float of a seismic source according to another exemplary embodiment.

In another embodiment illustrated in FIG. 5, an oscillation damping mechanism 321 may be located between the submersible float 311 and the individual source 321a (other individual sources may not be visible being hidden behind the source 321a in this view). The damping mechanism 321 may include a spring. Other damping mechanisms may be used as it would be recognized by those skilled in the art.

Rotatable wings, which are labeled 330a and 330b in FIGS. 3, 4 and 5, are located laterally on the submersible float 310 and 311, respectively, and are configured to rotate in order to adjust their angles with a horizontal plane, thereby to control the depth of the submersible float. The horizontal plane may be, for example, defined as including the longitudinal axis 301 and the horizontal direction 302 (that is, substantially perpendicular to the towing direction T). However, in a more general sense, the horizontal plane can be defined as being perpendicular to the gravity direction.

The submersible float 310 or 311 may also have a tail rudder 340 configured to have its angle with a vertical plane adjusted to control the horizontal position of the submersible float. The vertical plane may be, for example, defined as including the longitudinal axis 301 and the vertical axis 303. However, in a more general sense, the vertical plane can be defined as being perpendicular to the horizontal direction 302. Although the tail rudder 340 is illustrated in FIG. 3 as being located at the back end of the submersible float 310, this position is exemplary and it is not intended to be limiting. The wings 330a and 330b and the rudder 340 may be mounted at various locations on the submersible float: front, middle, tail, upper surface or lower surface thereof.

Figure 6:
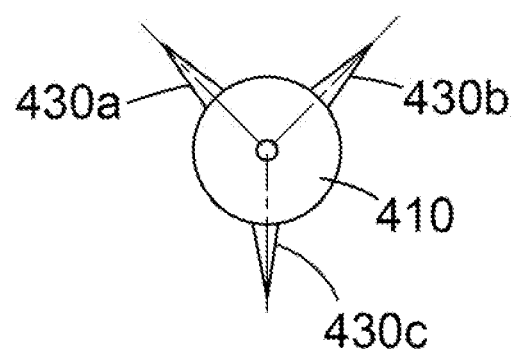
FIG. 6 is a front view of a submersible float of a seismic source according to another exemplary embodiment.

In an alternative embodiment, three fins 430a, 430b and 430c may be arranged as illustrated in FIG. 6. Fins 430a and 430b may be rotated at different angles to generate forces having horizontal and/or vertical components in order to steer the float 410 towards a target position. Fin 430c may be ballasted and configured to rotate freely in order to stabilize the float 410.

Returning now to FIG. 3, additionally, the submersible float 310 may also include one or more ballast chambers 350 configured to be filled with or emptied of water, thereby enabling adjustment of the depth of the submersible float 310.

The seismic source 300 may also include one or more position sensors configured to determine a current location of the submersible float. For example, the current location may be determined using a Global Positioning System (GPS) device 360 floating on the water surface while being attached to the submersible float 310. In one embodiment, the GPS device 360 may be retractable to adjust to changes in the depth of the submersible float 310. In another embodiment, the position sensors may be underwater acoustic positioning sensors determining the submersible float's position relative to a reference position, such as, the towing vessel.

Figure 7:
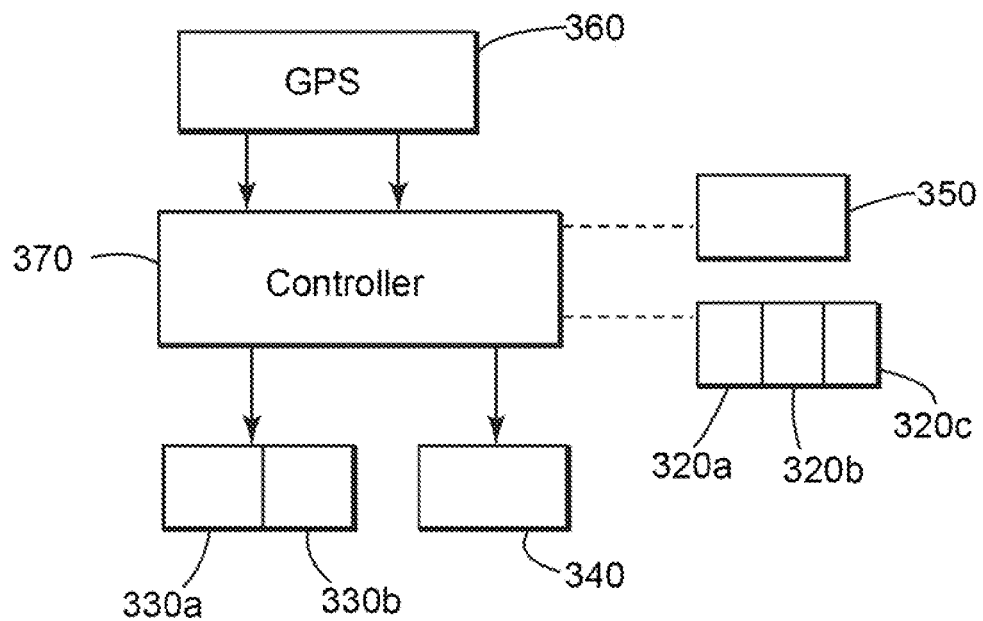
FIG. 7 is block diagram of a seismic source according to another exemplary embodiment.

The submersible float may be configured to be controlled by a control unit 370. As illustrated in FIG. 7, the control unit 370 is configured to receive information about the current location of the submersible float from the position sensors, such as the GPS device 360, and to send control signals to the rotatable surfaces, such as the pair of wings 330a and 330b, and the tail rudder 340, to steer the submersible float 310 toward a target position. The control unit 370 may be located inside the float 310 or on the towing vessel 100. The control unit 370 may also be configured to control the adjustable distance d under the submersible float 310 at which the individual sources are positioned. Alternatively or additionally, the control unit 370 may also be configured to control filing or emptying the one or more ballast chambers 350.

Figure 8:
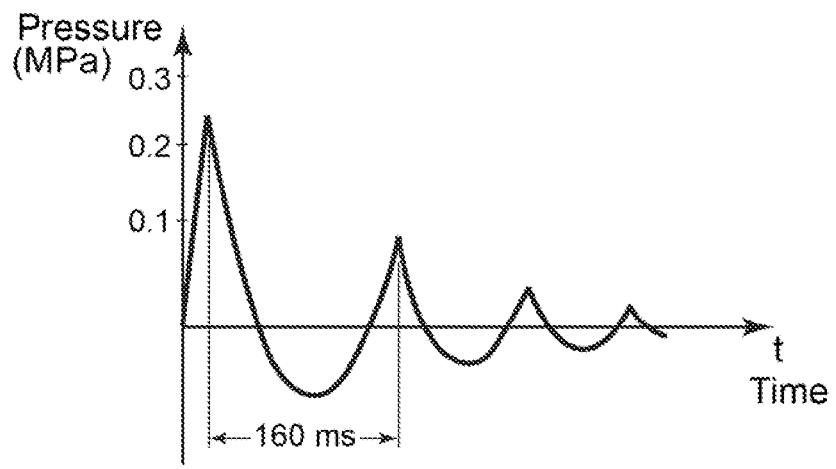
FIG. 8 is a graph illustrating pressure variation measured by a near field sensor as a function of time after a gun is fired.

If the float were configured to be towed at sea surface, the float buoyancy and the weight of the individual sources hanging under the float would work together to dampen the pressure variations due to the source firing (e.g., regularly, at about 15 s interval). When the float is towed underwater, the pressure variations caused by gun firing may last up to three seconds having the evolution similar to the one illustrated in FIG. 8. FIG. 8 represents pressure variation measured by a near field sensor and caused by two 250 cm³ parallel guns positioned at 5 m depth, firing air at 3000 psi. The first (largest) pressure oscillation corresponds to a bubble spreading, in a first approximation, like a spherically wave in the water. The second and following pressure oscillations reach the float at larger distances from the source than the first pressure oscillation and no longer have enough energy to cause a significant de-stabilizing effect.

Figure 9A:
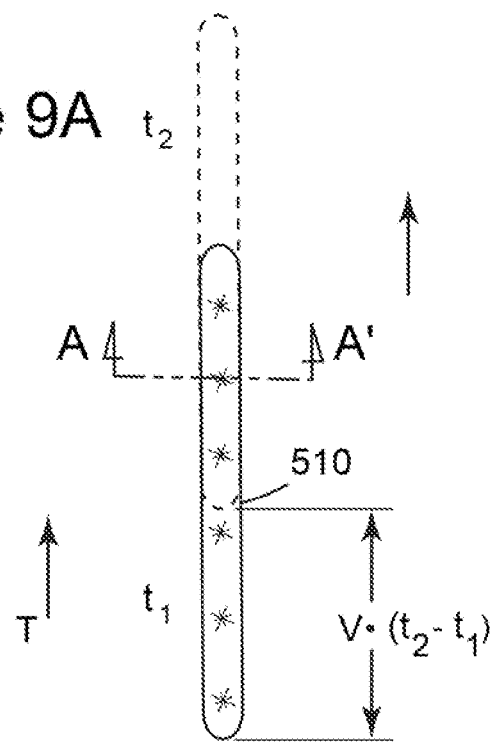
FIGS. 9A and 9B illustrate the manner in which a pressure oscillation caused by an individual source firing affects stability of a float towed underwater with its longitudinal axis substantially parallel to the towing direction, according to an exemplary embodiment.
Figure 9B:
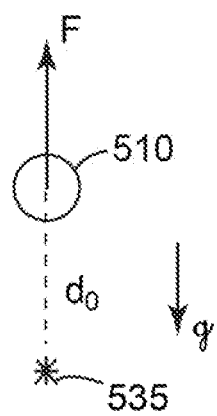

FIGS. 9A and 9B are an aerial view and a vertical view of a float 510 having the individual sources (not shown) arranged along its longitudinal axis (i.e., the same source arrangement as illustrated in FIG. 3), the float 510 being towed with its longitudinal axis parallel to the towing direction T. The bubbles 535 (i.e., pressure oscillations), which are generated at $t_1$ by the individual sources, affect the stability of the float 510 at $t_2$. In FIG. 9A, the float 510 as positioned at $t_1$ is drawn using a continuous line, and the float 510 as positioned at $t_2$ is drawn using a dashed line. During the time interval $t_2-t_1$, while the bubble expands, in a first approximation, like a spherically wave, the pressure oscillation traveling the distance $d_0$ from the individual source to the float. Meanwhile, the float 510 advances a distance equal to the towing speed v (e.g., about 5 knots or 2.5 m/s) times the time interval $t_2-t_1$. This distance $v(t_2-t_1)$ traveled by the float 510 is likely less than the length of the float. As illustrated in FIG. 9B, which represents a vertical cross-section A-A' as marked on FIG. 9A, the force F due to this pressure oscillation pushes the float 510 vertically towards the water surface (i.e., in a direction opposite to gravity).

Figure 10A:
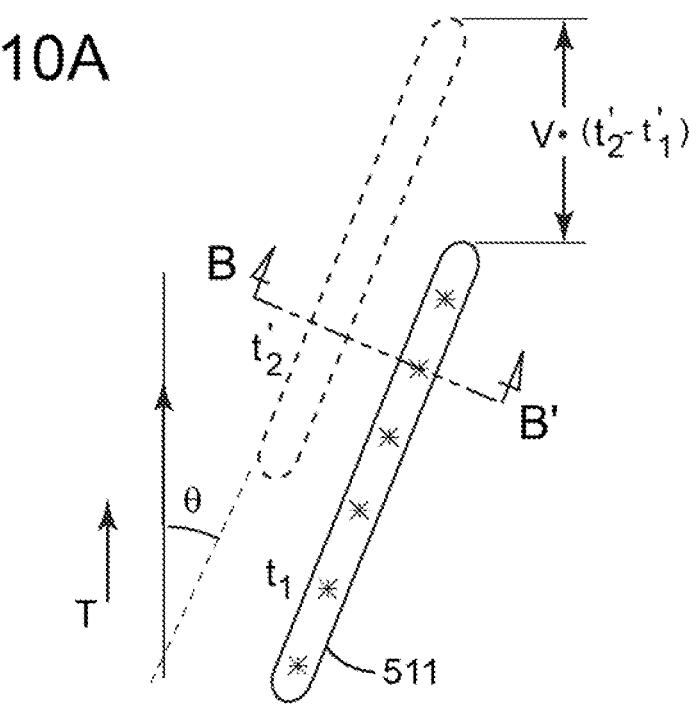
FIGS. 10A and 10B illustrate the manner in which a pressure oscillation caused by an individual source firing affects stability of a float towed underwater with its longitudinal axis making a non-zero angle with the towing direction, according to an exemplary embodiment.
Figure 10B:
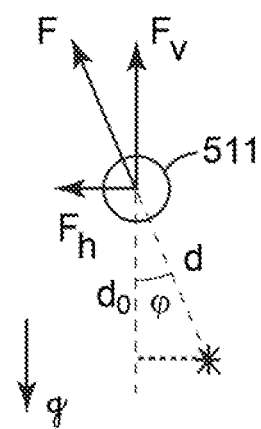

In order to alleviate this problem, a float 511 is configured to be towed such that its longitudinal axis to make a non-zero angle θ with the towing direction T. FIGS. 10A and 10B are an aerial view and a front view of the float 511 having the individual sources arranged along its longitudinal axis (i.e., the same source arrangement as illustrated in FIG. 3). In this situation, the pressure oscillation that is generated at $t_1$ travels the distance $d > d_0$ until reaching the float at $t'_2 > t_2$, where $d^2 = d_0^2 + (v \sin \theta (t'_2-t_1))^2$. Based on energy conservation, the energy per unit area of an expanding spherical wave decreases as $1/r^2$ (where r is the distance from the point source). Thus, if $E_0$ is the energy per unit area when the pressure oscillation reaches the float 510 towed with the sources aligned along the towing direction (i.e., as in FIG. 9A), the energy per unit area $E < E_0$ when the pressure oscillation reaches the float 511 towed at the non-zero angle θ relative to the float's longitudinal axis along which the sources are aligned, is $$E = E_0 \frac{d_0^2}{d^2}.$$

Additionally, as illustrated in FIG. 10B, which is a vertical cross-section B-B' as marked on FIG. 10A, the force F due the pressure bubble pushes the float at an angle φ with the vertical direction. Only a part $$F_v = F \cos \varphi = F \frac{d_0}{d}$$

of this force affects the stability of the float pushing it vertically. Thus, by towing the float 511 with its longitudinal axis making a non-zero angle θ with the towing direction T, the effect of the pressure bubbles generated when the guns are fired is substantially diminished.

Figure 11:
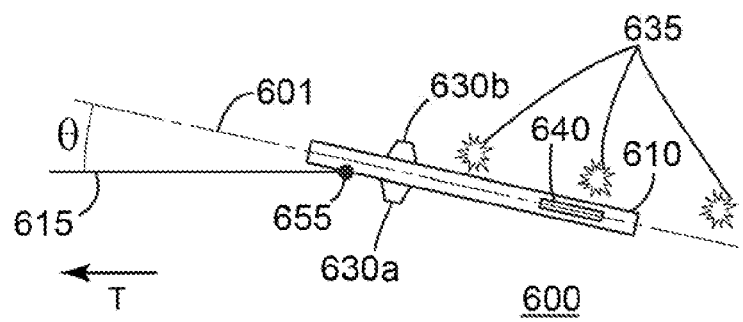
FIG. 11 is a submersible float of a seismic source according to another exemplary embodiment.

FIG. 11 is an aerial view of a seismic source 600 configured to be towed underwater via a towing cable 615 according to another exemplary embodiment. The seismic source 600 includes a submersible float 610 and plural individual sources (not shown) attached under the submersible float 610, at different positions along a longitudinal axis 601 of the submersible float 610. Similar to source 300, the seismic source 600 includes wings 630a and 630b and a tail rudder 640.

When individual sources (air guns) are fired (e.g., discharged), an undesirable trail bubble 635 forms. The towing cable 615 is attached on a side of the submersible float 610 at 655, such that the towing cable 615 makes a non-zero angle with the longitudinal axis 601.

Figure 12:
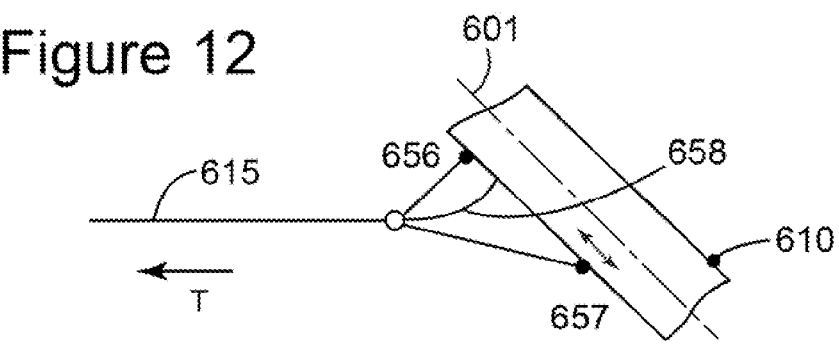
FIG. 12 illustrates the manner of attaching a towing cable to a float according to another exemplary embodiment.

The manner in which the towing cable 615 is attached on the side of the submersible float 610 may allow varying the non-zero angle, thus providing an additional degree of liberty in maneuvering the seismic source. For example, in FIG. 12, the towing cable 615 is attached to the submersible float 610 via two tow ropes 656 and 657. The rope 656 can be attached to a fixed position on the submersible float 610, but the position at which the rope 657 is attached to the submersible float 610 may vary longitudinally, thereby varying the angle θ of the float 610 with the towing direction T. This angle adjustment can make the float operate as a diverter to steer itself to the specified position together with other steering means.

Additionally, the float 610 may receive air for the ballast chambers and/or electrical/optical signals via a separate link 658.

Figure 13:
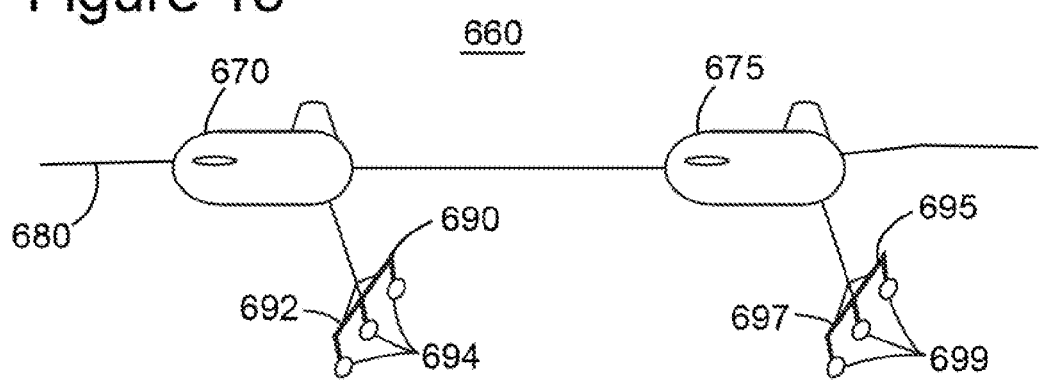
FIG. 13 is a seismic source with plural floats according to another exemplary embodiment.

FIG. 13 illustrates another embodiment of a seismic source 660 having two floats 670 and 675 pulled by the same cable 680. Each of the floats has attached a cluster of seismic guns (i.e., individual sources) 690 and 695. In FIG. 13, support bars 692 and 697 are attached to the floats 670 and 675, respectively. The individual sources 694 and 699 are arranged along the support bars 692 and 697, respectively. In other embodiments, the clusters may have multiple levels, multiple rows, multiple columns or may have the guns arranged circularly.

The effect of the pressure variation is diminished for the source 660, because each cluster of guns trails behind the float from which it is attached, and the spacing between floats may be calculated such that to minimize the effect of the pressure variation due to the guns 690 attached to the first float 670, on the stability of the second float 675 towed behind the first float 670. Although only two floats, 670 and 675, are illustrated in FIG. 13, the number of floats towed in series is not limited to two. This embodiment also has the advantage that the source segments such as a float and the attached cluster of sources may be easily replaced for a more efficient handling and troubleshooting.

An angle of the support bar 692 or 697 with the towing direction in a horizontal plane may be adjusted, to achieve a similar reduction of the de-stabilizing effect of pressure bubbles as by towing the submersible float with sources attached longitudinally, at a non-zero angle with the towing direction. Being able to adjust this angle also provides more flexibility when the seismic source is recovered.

A vessel often tows two or more survey seismic source arrays. An array may include multiple source floats spread horizontally to maintain a distance of about 10 m between adjacent floats within the same array, while the arrays may have a distance of about 50 m in-between. The non-zero angle of the guns with the towing direction may be pre-set (fixed) or may be tuned for each float.

Some of the above-described embodiments provide an enhanced ability to maneuver a seismic source towed underwater including (1) vertical steering with wings, (2) horizontal steering with the tail rudder, (3) depth adjustment by filling or emptying ballast chambers, and (4) angular positioning of the longitudinal axis by attaching the towing cable on a side of the submersible float. Such a seismic source is suitable for use in arctic exploration, since the submerged float would not be affected by floating ice. Generally, this seismic source has enhanced capability to operate in rough weather. Further, this seismic source allows source steering that is required for 4D time lapse marine acquisition.

A flow diagram of a method 700 for performing marine exploration is illustrated in FIG. 14. The method 700 includes providing a seismic source, including (A) a submersible float, and (B) a plurality of individual sources hanging under the submersible float and configured to operate at a depth larger than a depth of the submersible float, at S710. The method 700 further includes adjusting angles of one or more rotatable surfaces attached to the submersible float to steer the submersible float toward a target position at S720. The target position may be characterized by depth and a horizontal position in a plane perpendicular to the towing direction. The horizontal position may be defined along a direction substantially perpendicular to the towing direction and to gravity. The method 700 may also include extracting information about a formation under a seabed based on reflections of seismic waves generated by the individual sources.

In some embodiments, the step of adjusting angles may include (1) adjusting an angle of a pair of rotatable wings located laterally on the submersible float to steer the submersible float vertically, and/or (2) adjusting an angle of a tail rudder with a vertical plane to steer the submersible float horizontally. The depth of the submersible float may also be adjusted by filling or emptying ballast chambers with/of fluid.

The individual sources may be configured to hang at an adjustable distance under the submersible float, and the method 700 may further include adjusting the distance at which the individual sources hang under the submersible float.

In one embodiment, the method 700 further includes determining a current location of the submersible float, and then generating and transmitting control signals to adjust the depth and the horizontal position, based on the current location. The current position may be determined using a GPS device floating above and attached to the submersible float.

In one embodiment, the towing cable may be attached to a side of the submersible float to make a non-zero angle with the longitudinal axis of the submersible float, and the method may then further include adjusting a location where the towing cable is attached to the side of the submersible float.

The disclosed exemplary embodiments provide a seismic source with a steerable submersible float and related methods. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic source configured to be towed underwater, the source comprising:
    a submersible float configured to control at least one of a depth and a horizontal position of the submersible float by adjusting angles of one or more rotatable surfaces mounted on the submersible float, the horizontal position being defined to be along a horizontal direction that is substantially perpendicular to a towing direction and to gravity;
    a plurality of individual sources hanging under the submersible float and configured to operate at a depth larger than the depth of the submersible float; and
    a control unit located inside the submersible float and configured
        to receive information about a current location of the submersible float, and
        to send control signals to adjust the angle of the one or more rotatable surfaces to steer the submersible float from the current location to a target position.

2. The seismic source of claim 1, wherein the individual sources are attached at different positions along a longitudinal axis of the submersible float.

3. The seismic source of claim 1, wherein the individual sources are clustered, being arranged along a support bar that is attached via a cable to the submersible float.

4. The seismic source of claim 1, wherein the individual sources are configured to hang at an adjustable distance under the submersible float.

5. The seismic source according to claim 1, wherein a damping mechanism is located between an individual source or a support bar along which the individual sources are clustered and the submersible float.

6. The seismic source of claim 1, wherein a towing cable is attached on a side of the submersible float such that the towing cable makes a non-zero angle with a longitudinal axis of the submersible float.

7. The source of claim 6, wherein the towing cable is attached such that the non-zero angle to be adjustable.

8. The source of claim 7, wherein the towing cable is attached to the submersible float via a rope connected to the side of the submersible float at two positions, location of at least one of the two positions being adjustable in a direction parallel with the longitudinal axis.

9. The seismic source of claim 1, wherein the one or more rotatable surfaces includes:
a pair of rotatable wings mounted laterally on the submersible float, and configured to have their angles adjusted to control the depth of the submersible float, and
a tail rudder mounted on an upper or lower surface of the submersible float, and configured to rotate around a vertical axis to control the horizontal position of the submersible float.

10. The seismic source of claim 1, wherein the submersible float includes one or more ballast chambers configured to be filled with or emptied of fluid, thereby enabling adjustment of the depth of the submersible float.

11. The seismic source of claim 1, further comprising:
position sensors configured to determine the current location of the submersible float and to send the information to the control unit.

12. The seismic source of claim 1, further comprising:
at least one other submersible float configured (A) to be towed underwater behind and attached to the submersible float, and (B) to control at least one of a depth and a horizontal position of the at least another submersible float by adjusting angles of one or more rotatable surfaces attached to the at least one other submersible float; and
another plurality of individual sources attached individually or as a cluster to hang under the at least one other submersible float, and being configured to operate at another depth that is larger than the depth of the at least another submersible float.

13. A method for performing seismic marine exploration, comprising:
providing a seismic source including (A) a submersible float, and (B) a plurality of individual sources hanging under the submersible float and configured to operate at a depth larger than a depth of the submersible float;
adjusting angles of one or more rotatable surfaces mounted on the submersible float to steer the submersible float towards a target position; and
damping oscillations of the individual sources using a mechanism located between the individual sources and the submersible float.

14. The method of claim 13, wherein the adjusting of the angles includes:
adjusting angles of a pair of rotatable wings mounted laterally on the submersible float to steer the submersible float vertically substantially parallel to gravity, and
adjusting an angle of a tail rudder mounted on an upper or lower surface of the submersible float to steer the submersible float horizontally, along a horizontal direction that is substantially perpendicular to a towing direction and to gravity.

15. The method of claim 13, further comprising:
attaching a second submersible float to be towed underwater behind the submersible float in a towing direction, the seismic source further comprising a second plurality of individual sources hanging under the second submersible float.

16. The method of claim 13, further including filling or emptying one or more ballast chambers with fluid to adjust the depth of the submersible float.

17. The method of claim 13, wherein the individual sources are compressed air guns.

18. The method of claim 13, wherein the individual sources are configured to hang at an adjustable distance under the submersible float and the method further comprises:
adjusting the distance at which the individual sources hang under the submersible float.

19. The method of claim 13, further comprising:
determining a current location of the submersible float; and
generating and transmitting control signals, based on the current position and a target position, to steer the submersible float toward the target position.

20. A seismic source configured to be towed underwater, the source comprising:
a submersible float configured to be towed at a target depth and a target horizontal position;
a towing mechanism configured to connect the submersible float to a tow cable such that a longitudinal axis of the submersible float to make an adjustable non-zero angle with a towing direction; and
individual sources hanging under the submersible float and being attached at different positions along the longitudinal axis of the submersible float, the individual sources being configured to operate at a depth larger than the target depth of the submersible float.

* * * * *